Jan. 2, 1940.　　　　　J. EDGAR　　　　　2,185,839
METHOD OF MAKING HOBS
Original Filed June 30, 1930　　2 Sheets-Sheet 1
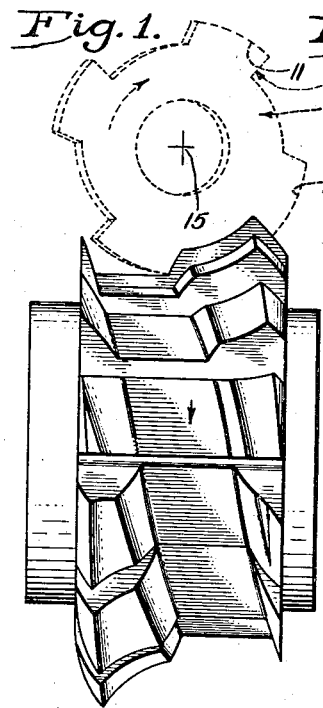
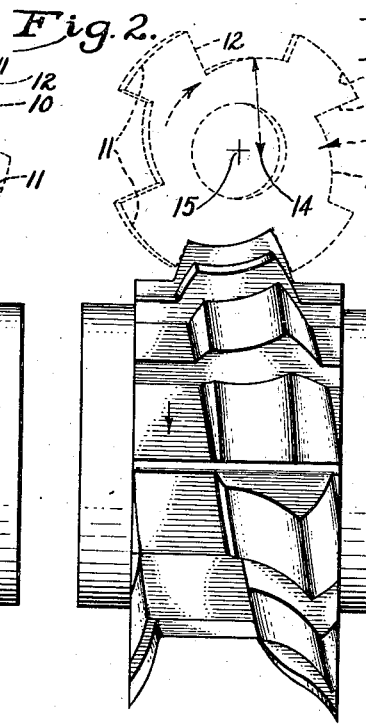
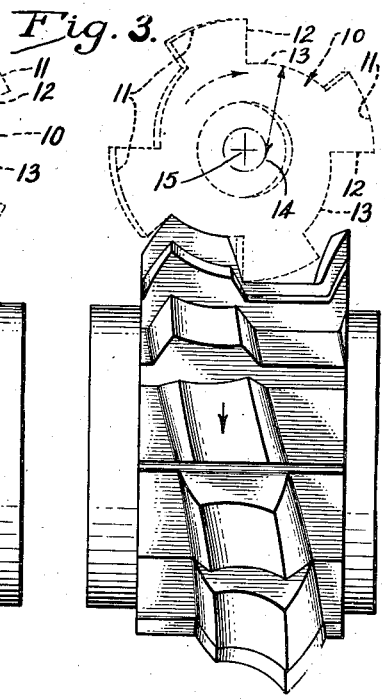
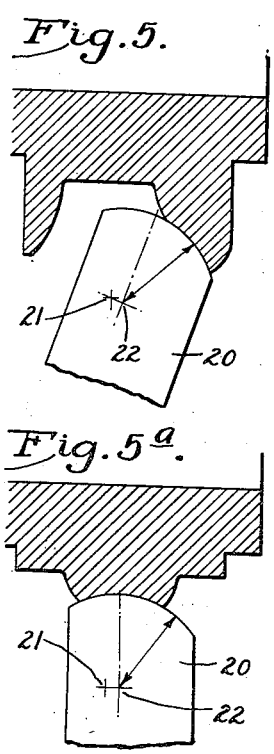
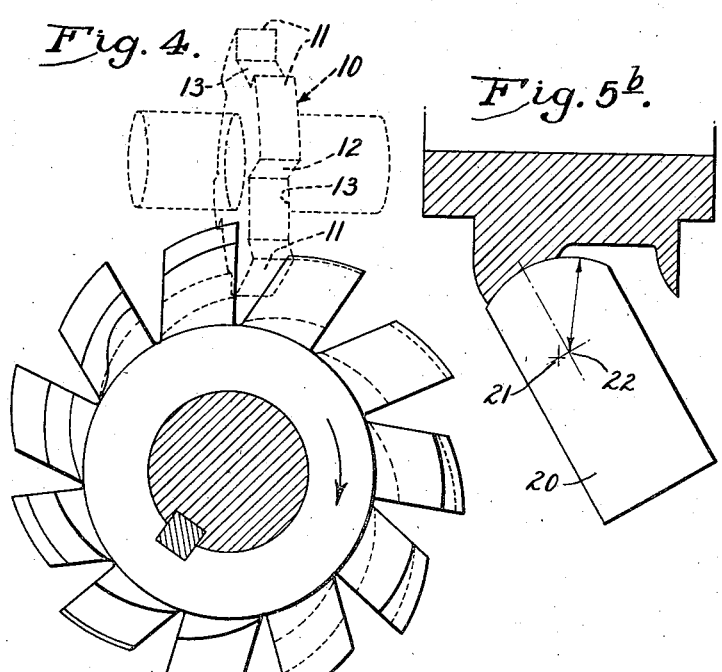
INVENTOR
John Edgar
BY
ATTORNEYS Jan. 2, 1940.                J. EDGAR                 2,185,839
                         METHOD OF MAKING HOBS
              Original Filed June 30, 1930    2 Sheets-Sheet 2
Fig. 6.
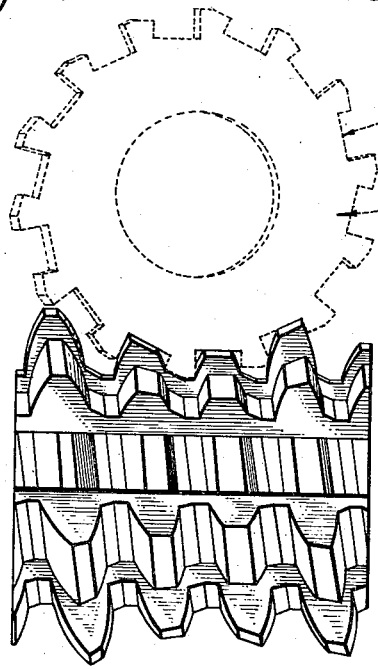
Fig. 8.
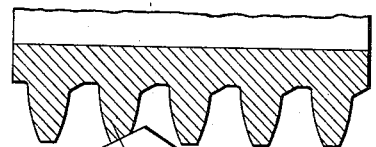
Fig. 8ª.
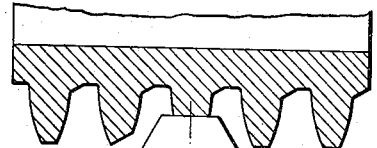
Fig. 7.
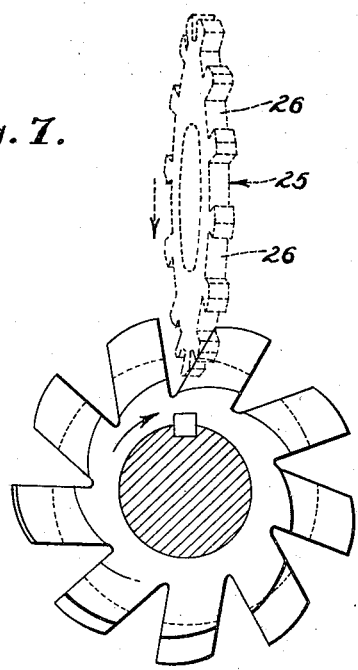
Fig. 8ᵇ.
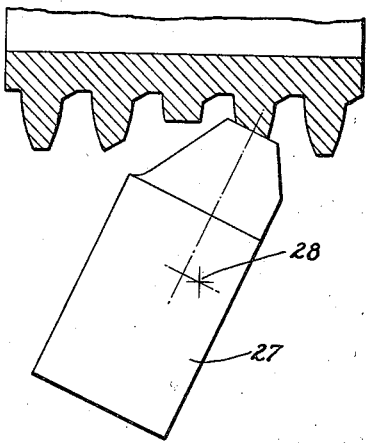
INVENTOR
John Edgar
BY
Parker, Carlson, Pitney & Hubbard
ATTORNEYS Patented Jan. 2, 1940

2,185,839

UNITED STATES PATENT OFFICE 2,185,839

METHOD OF MAKING HOBS

John Edgar, Rockford, Ill., assignor to Barber-Colman Company, Rockford, Ill., a corporation of Illinois Original application June 30, 1930, Serial No. 464,856, now Patent No. 2,010,353, dated August 6, 1935. Divided and this application July 3, 1935, Serial No. 29,590

7 Claims. (Cl. 76—101)

This invention relates in general to methods of making metal cutting tools and more particularly to a method of making hobs for cutting ratchets or the like.

The present application is a division of my original application, Serial No. 464,856, filed June 30, 1930, now Patent No. 2,010,353, issued August 6, 1935.

In ratchets, or the like, the root portions between the teeth sometimes are other in form than cylindrical and concentric about the axis of the ratchet. Thus, these root portions may be cylindrical but eccentric to the axis of the ratchet. In this instance, each root portion has a different center, but the respective centers are similarly spaced about the axis of the ratchet. The root portions also may be non-cylindrical in form, as for example in the form of plane surfaces.

Heretofore, it has been impossible to hob ratchets of the general form in which the root portions were other than cylindrical and concentric with the axis of rotation without developing large fillets at the junctions of the root portions and the sides of the teeth. This fault was particularly pronounced where the tooth depth was great as compared with the width of the tooth space.

It is, therefore, the general object of the invention to provide a method of making an improved hob of the type required to generate ratchets, and the like, of the above described form.

Another object is to provide a method of making a hob of this character which will generate a ratchet having no objectionable fillets between the sides of the teeth and the root portions.

Other objects and advantages will become apparent from the following detailed description taken in connection with the accompanying drawings, in which:

Figures 1, 2 and 3 are views of a hob embodying the features of the invention, and shown in progressive operative relation to a ratchet.

Fig. 4 is an end elevation of the hob with the ratched generated thereby shown in dotted lines in operative relation thereto.

Figs. 5, 5ª and 5ᵇ are fragmentary radial sections illustrating the positions of the tool in forming the hob.

Fig. 6 is a view similar to Fig. 4 showing a modified form of hob with the ratchet generated thereby shown in dotted lines in operative relation thereto.

Fig. 7 is an end elevation of the hob shown in Fig. 6, with the ratchet produced thereby shown in dotted lines.

Figs. 8, 8ª, and 8ᵇ illustrate various positions of the tool in forming the modified form of hob.

Heretofore, hobs for generating ratchets were unable to generate the root portion with sharp corners between the sides of the teeth and the root portion. The outer ends of the hob teeth for the root portion of the ratchet, while the sides of the hob teeth form the sides of the ratchet teeth. Hence, in order to give the desired shape to the root portion of the ratchet, it is necessary to modify the outer ends of the hob teeth. In the improved hob, herein disclosed, the outer ends of the hob teeth are so modified that they will form the desired root portion of the ratchet. This is accomplished by separate and additional operations in forming the hob.

The ratchet, shown at 10 in Figs. 1 to 4 of the drawings, illustrates a type that may be formed by a hob made by the method herein disclosed.

This ratchet has teeth 11 with straight sides, one of which generally lies on a radius as shown at 12 in order to provide a proper abutment for a cooperating pawl (not shown). Between each pair of adjacent teeth 11, the bottom or root portion 13 is circular in form with its center 14 offset a predetermined distance from the axis 15 of the ratchet. Each root portion 13 has a different center 14, but all the centers 14 are similarly disposed relative to the axis 15 of the ratchet so that they lie in a circle concentric to the axis 15.

To generate this ratchet, a hob is produced which is standard in all respects except that the tooth depth is greater than necessary to produce a root portion of a predetermined shape, in order to produce keys having straight sides extending to said root portion. This hob is produced by cutting a thread of constant lead in a hob blank, forming teeth in said thread by cutting transverse gashes in the blank, and relieving the teeth. The interfering portions of the teeth then are turned off, thereby superimposing a milling cutter on the teeth.

In forming the milling cutter which is superimposed upon the teeth, a form tool 20 (Figs. 5, 5ª and 5ᵇ) is employed to turn off the outer ends of the elongated teeth of the hob. In the case of making a hob to form the ratchet 10, the form tool has a circular contour having a center 22 and a radius substantially equal to the radius of the root portions 13 of the ratchet to be generated. For the turning operation, the form tool 20 is mounted with its effective cutting edge in an axial plane of the hob for swinging movement in said plane on an axis 21 bearing the same relation to the center 22 that the axis 15 of the ratchet bears to the center 14 of the root portion. The hob is rotated about its own axis and simultaneously the tool is swung about the axis 21 through an angle equal to the circular pitch of the teeth of the ratchet for each revolution of the hob.

At the start of the turning operation, the form tool is spaced from the hob axis sufficiently to permit removal of a suitable amount of metal. However, after the swinging movement, the tool and hob are shifted relatively nearer to each other and the swinging movement of the tool and rotation of the hob is repeated to remove more metal. This cycle of simultaneously swinging the tool and rotating the hob, and then the relative shifting movement is repeated until the axis 21 is moved to a point relative to the hob corresponding to the position of the axis 15 of the ratchet relative to the hob during the hobbing operation.

Theoretically, the tool should lie in a plane perpendicular to the helix of the hob in order to form a groove or depression therein of a circular contour in said plane, and the swinging of the tool should be in said plane. Thus, a groove would be cut having an elliptical contour in an axial plane. But a close approximation of such form can be obtained by swinging the tool in an axial plane as described, and making the radius of the circular contour of the tool slightly greater than that theoretically required.

This turning operation cuts a peripheral helical groove in the hob of a constant lead in the same direction as, but less in degree than, the lead of the thread of the teeth. The centers of successive transverse contours of the teeth are located progressively along a helix about a circular line which is concentric with the hob axis and which is located in a transverse plane of the hob.

In Figs. 6 and 7 a modified form of hob is shown which is adapted to generate a ratchet 25 in which the root portion 26 is straight. For this hob, a form tool 27, which is used to turn away the interfering portions of the teeth, (Figs. 8, 8ᵃ and 8ᵇ) has a form corresponding to the root portion 26 of the ratchet 25, which form is a straight line, and the tool is swung during the turning operation about an axis 28 corresponding to the axis of the ratchet 25 in the same manner as was previously described.

It is apparent from the foregoing that I have provided a new and improved method of making a hob which will generate a ratchet or the like having a root portion other in form than cylindrical and concentric with the axis of the ratchet. It is also evident that such a ratchet has no objectionable fillets between the sides of the teeth and the root portions of the ratchet.

I claim as my invention:

1. The method of making a hob for generating ratchets or the like comprising threading and gashing and relieving the teeth thereon, rotating said blank about its axis and feeding a form tool by a swinging movement in a predetermined plane including the axis of the hob into engagement with said teeth to cut a groove therein, said groove having a circular contour in any plane including the axis of the hob, the circular contour in said predetermined plane being eccentric to the axis of swinging.

2. The method of making a hob for generating ratchets or the like, which includes threading, gashing and relieving a blank to form teeth thereon, rotating said blank about its axis and removing a portion of said teeth by a tool having a form substantially the same as the root portion of the ratchet and swinging said tool about an axis corresponding to the axis of the ratchet, the axis of rotation of the tool being eccentric to the form of the tool in the same manner that the axis of the ratchet is spaced from the center of the circular form of the root portion of the ratchet.

3. The method of making a hob for generating ratchets or the like, which includes threading, gashing and relieving a blank to form teeth thereon, rotating said blank about its axis and removing a portion of said teeth by a tool having a circular form whose center corresponds to the center of a root portion of the ratchet, said tool being swung in a plane including the axis of the hob and around an axis corresponding to the axis of the ratchet through an angle for each revolution of the hob equal to the circular pitch of the ratchet.

4. The method of making a hob for generating teeth comprising rotating the hob about its axis and turning the hob by means of a form tool of a circular contour which is swung in an axial plane, the center for said contour being eccentric to the axis of swinging.

5. The method of making a hob for generating tooth sections of a ratchet or the like which comprises forming teeth on the hob, providing a form tool having an arcuate cutting edge, mounting said tool for swinging movement about an axis eccentric to the center of curvature of said arcuate cutting edge and perpendicular to an axial plane of the hob with said cutting edge lying in said plane, and simultaneously imparting to the tool said swinging movement and rotating the hob about its axis in timed relation to remove portions of the teeth of the hob.

6. The method of making a hob for generating tooth sections of a ratchet or the like comprising forming teeth on the hob, providing a form tool having a cutting edge of substantially the same shape as the root portion of the ratchet, mounting said tool to swing on an axis bearing the same relation to said cutting edge as the axis of the ratchet bears to the root portion thereof and perpendicular to an axial plane of the hob, rotating said hob about its axis, moving said tool about said axis of swinging through angles equal to the circular pitch of the ratchet teeth for each revolution of the hob, and bodily shifting said tool toward the hob between each angular movement of the tool until said axis of swinging bears the same relation to the hob axis as the ratchet axis bears to the hob axis during the hobbing operation.

7. The method of making a hob for generating teeth comprising rotating the hob about its axis, and feeding a straight-edged form tool into cutting engagement with the teeth of the hob by a swinging movement about an axis located at one side of a normal to the line of contact of the tool and the hob teeth at the center of said line.

JOHN EDGAR.